J. J. GORMLEY AND E. L. THURBER.
MACHINE FOR PARING NUTS, &c.
APPLICATION FILED MAR. 1, 1920.

1,365,397.

Patented Jan. 11, 1921.
4 SHEETS—SHEET 1.

INVENTORS
James J. Gormley
and Edwin L. Thurber
BY
Redding & Greeley
ATTORNEYS

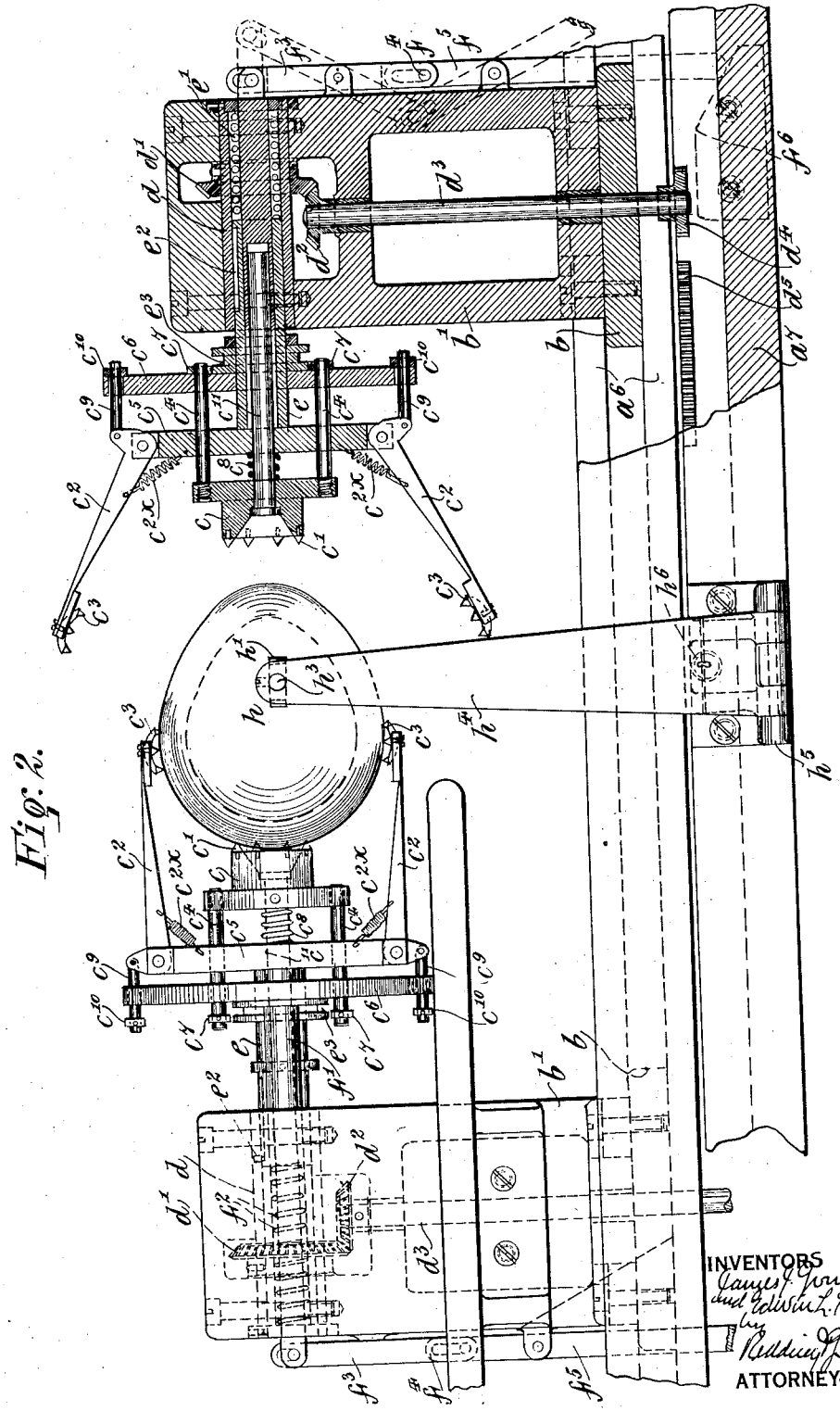

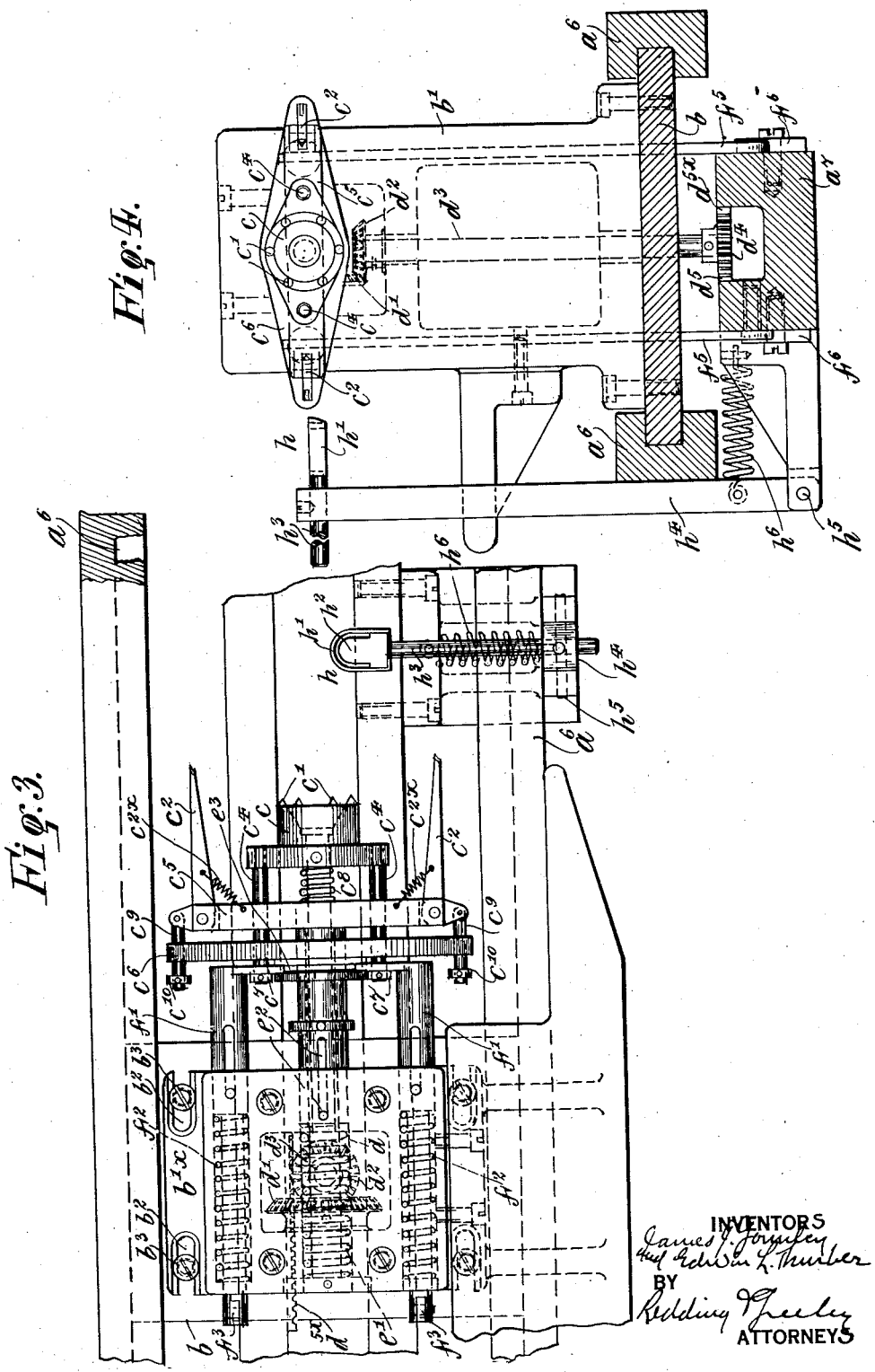

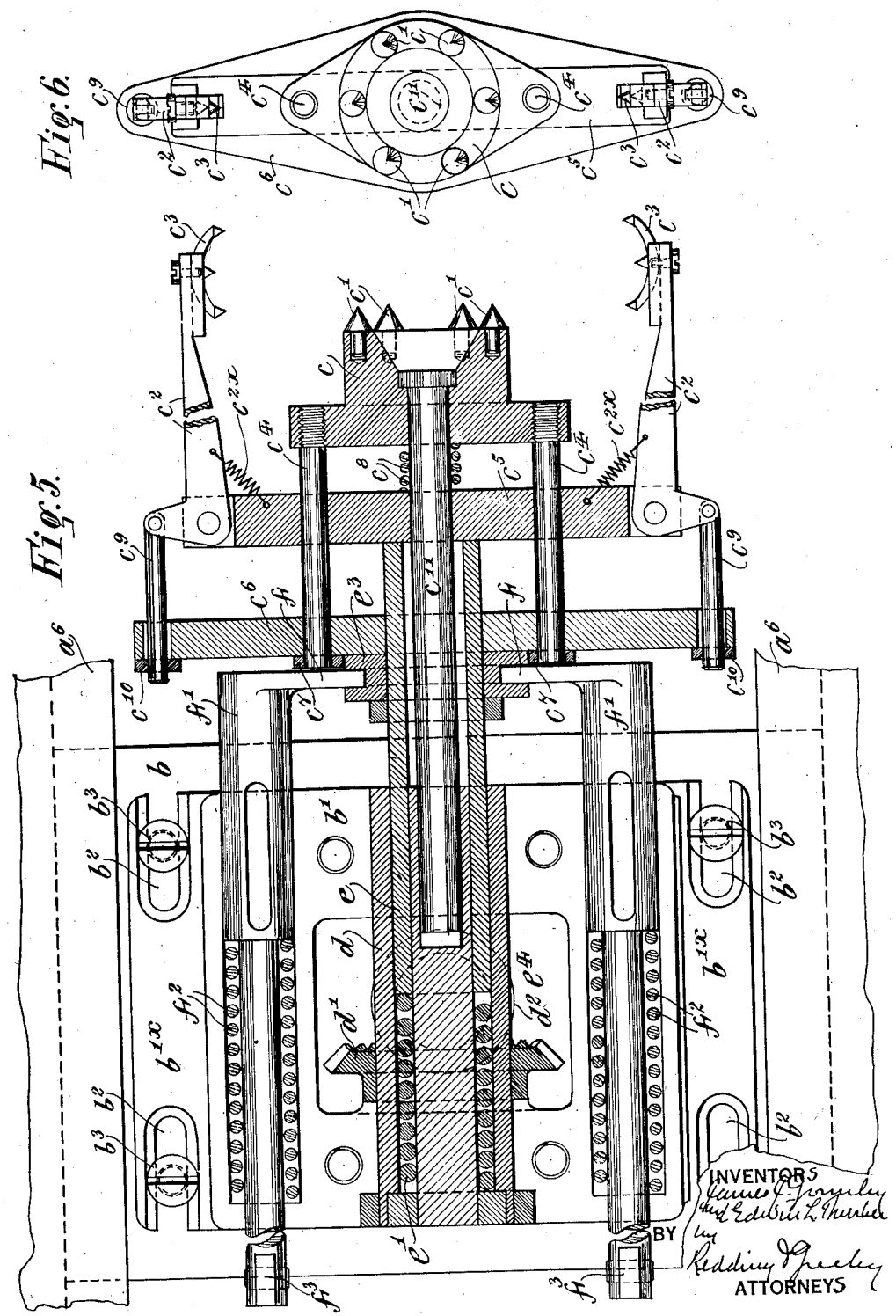

UNITED STATES PATENT OFFICE.

JAMES J. GORMLEY AND EDWIN L. THURBER, OF BROOKLYN, NEW YORK.

MACHINE FOR PARING NUTS, &c.

1,365,397.  Specification of Letters Patent.  Patented Jan. 11, 1921.

Application filed March 1, 1920. Serial No. 362,538.

*To all whom it may concern:*

Be it known that we, JAMES J. GORMLEY and EDWIN L. THURBER, citizens of the United States, residing in the borough of Brooklyn, the city of New York, in the State of New York, have invented certain new and useful Improvements in Machines for Paring Nuts, &c., of which the following is a specification, reference being had to the accompanying drawings forming a part hereof.

In another application of the present applicants for Letters Patent of the United States, Serial No. 349,943, filed January 7, 1920, there is shown and described one form of a machine devised with particular reference to its use in the removal of the closely adhering, brown skin from the unbroken meat of the cocoanut after the hard shell has been cracked off, although the machine obviously is capable of use for other similar purposes. In that machine each nut is delivered to the holding device by which it is passed through an annular knife carrier, and is discharged after the operation of paring has been completed, but one nut at a time being subjected to the paring operation. In the machine shown and described in the present case several sets of nut holding devices are mounted upon a carrier so that as each nut is received from the feeding chute it is carried onward and the paring operation is continued while another set of holding devices is moved up to the feeding chute in readiness to receive another nut and the first nut is discharged at a point beyond the feeding chute. In this manner the production of the machine is greatly increased. In the present case, moreover, the nut holding and paring devices are designed with reference to their application to a carrier and their operation under the conditions referred to. The invention will be explained more fully hereinafter with reference to the accompanying drawings in which the machine chosen as an embodiment of the invention is illustrated and in which, Figure 1 is a perspective view, largely in outline, illustrating the application of the nut holding devices to an endless carrier, the feeding chute being shown partly in section.

Fig. 2 is a view partly in side elevation and partly in longitudinal section, showing a portion of the carrier and its guideway, the knife, and one set of nut holding devices.

Fig. 3 is a top view of some of the parts shown in Fig. 2.

Fig. 4 is a view partly in transverse section and partly in elevation looking toward the left hand in Fig. 3.

Fig. 5 is a detail view mainly in horizontal section, of one member of one of the nut gripping devices, on a larger scale than that of Fig. 3.

Fig. 6 is a view of the nut gripping devices as seen in elevation from the right hand in Fig. 5.

Figure 1:
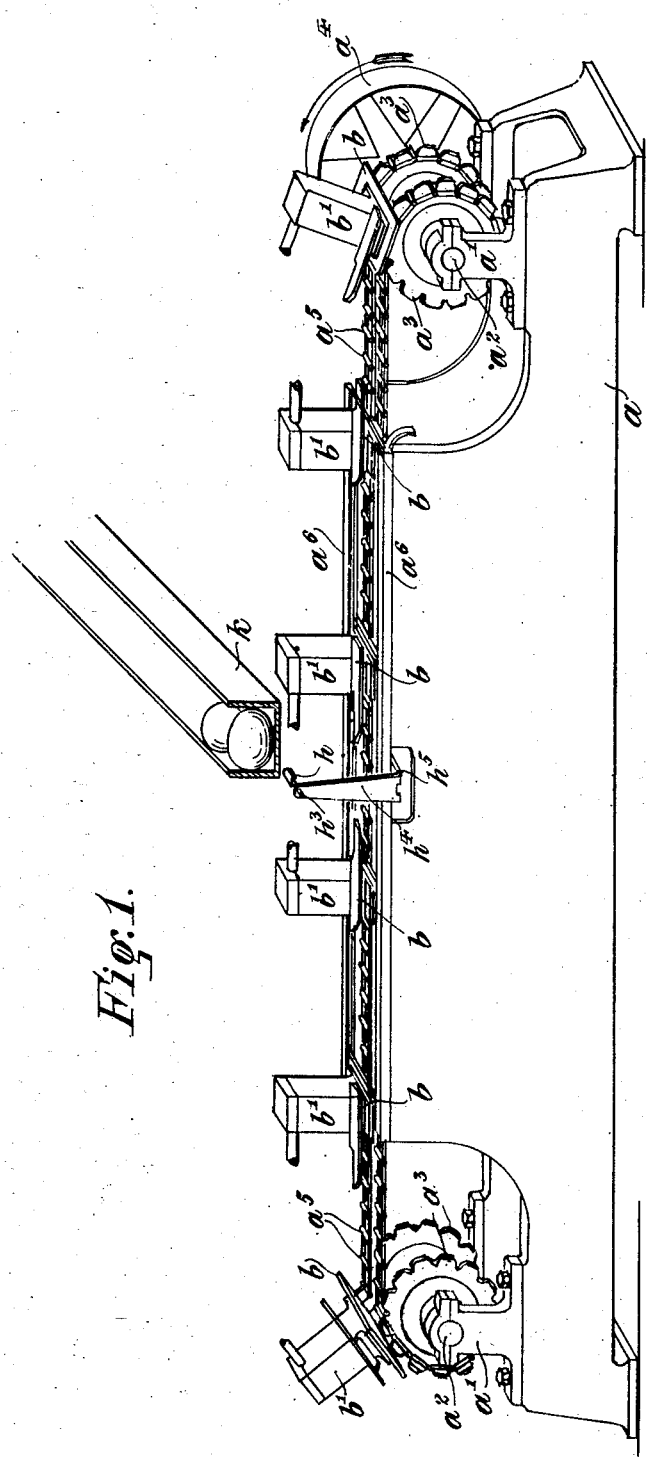

The carrier may be of any suitable character. As indicated in Fig. 1 it may comprise a suitable frame $a$, bearing pedestals $a'$ in which are mounted shafts $a^2$, chain wheels $a^3$ fixed on the shafts, a driving wheel $a^4$, fixed on one of the shafts, and chains $a^5$ which have a relatively slow and steady movement.

To the chains $a^5$ are secured at intervals plates $b$ arranged in pairs to support corresponding pedestals $b'$. The plates or bases $b$ are guided in ways $a^6$ carried by the frame $a$. Each pedestal $b'$, of each pair, supports the devices for gripping and rotating the nut during the operation of paring. The construction of these devices is the same for each set of devices of each pair and a description of one set of devices will therefore suffice for all, it being understood that the two sets of devices of each pair are reversed and opposed so as to act upon a nut between them.

The rotary gripping head comprises a chuck $c$ provided with suitable spurs $c'$ for engagement with the corresponding end of the nut, and opposed gripping arms $c^2$, provided with suitable spurs, as at $c^3$, for engagement with the lateral surfaces of the nut, between its pole and its equator. The chuck $c$ is secured to rods $c^4$ which are extended rearwardly through two plates $c^5$ and $c^6$ and receive nuts or caps $c^7$ to limit their forward movement under the influence of a coiled spring $c^8$ which is located between the head $c$ and the plate $c^5$. The bell crank arms $c^2$ are pivoted on the plate $c^5$ and have connected thereto rods $c^9$ which also extend rearwardly through the plate $c^6$ and are headed and receive nuts or caps, as at $c^{10}$, to limit their forward movement with respect to the plate $c^6$. A spindle $c^{11}$ is also extended rearwardly from the head $c^9$ through the plates $c^5$ and $c^6$ and within the bearing in the pedestal $b'$.

A sleeve $d$, mounted to rotate in suitable bearings in the pedestal $b'$, has secured thereto, within the pedestal, a bevel gear $d'$ in mesh with a bevel gear $d^2$ on the upper end of a vertical shaft $d^3$. The latter is supported in suitable bearings in the pedestal $b'$ and has at its lower end a pinion $d^4$ adapted to engage a rack $d^5$ secured to a portion $a^7$ of the frame $a$. The rack $d^5$ does not extend the entire length of the frame $a$ but has only such length and is so located that while the nut is engaged by the nut holding devices and is moved past the knife hereinafter referred to the shaft $d^3$ and sleeve $d$ will be rotated and will cause the nut to rotate, as hereinafter described. If the gears $d'$ and $d^2$ of the two pedestals are differently positioned relatively, as indicated in Fig. 2, it is obvious that, in order that both sets of nut holding devices shall rotate in the same direction, there must be provided one rack $d^5$ for engagement with the right hand pinion $d^4$, and an opposite rack $d^{5\times}$ for engagement with the pinion $d^4$ of the left hand pedestal, it being understood that the two shafts $d^3$ are displaced substantially at their lower ends to permit of the engagement of one pinion $d^4$ with the rack $d^5$ and of the other pinion $d^4$ with the rack $d^{5\times}$.

Within the sleeve $d$ is a second sleeve $e$ which is pressed forward by a spiral spring $e'$, is compelled to rotate with the sleeve $d$ through a pin and slot connection $e^2$, and has secured to it at its forward end the plate $c^5$, passing through the plate $c^6$. On the sleeve $e$ is fixed a grooved collar $e^3$, which is engaged by a finger $f$ projecting from a rod $f'$ mounted in the pedestal and pressed forward by a spring $f^2$. Preferably two spring pressed rods $f'$ are provided, in order to secure movement of the collar $e^3$ without binding, and each rod is connected, outside the pedestal, with a lever $f^3$ pivoted on the pedestal. Each lever $f^3$ is connected at its lower end, through a pin and slot connection $f^4$, with a corresponding lever $f^5$, also pivoted on the pedestal. At its lower end each lever $f^5$ is arranged to co-act with a cam $f^6$ which is fixed on the frame member $a^7$. When, in the movement of the carrier plate $b$, with the chain $a^5$, the lever $f^5$ strikes the cam $f^6$ the two levers are thrown from the position indicated by full lines in Fig. 2 to the position indicated by broken lines and the rods $f'$ are drawn rearwardly, the sleeve $e$ and the plate $e^6$ being drawn rearwardly at the same time. Through the rods $c^9$ the gripping arms $c^2$ are thus turned on their pivots from the gripping position, shown at the left hand in Fig. 2, to the open position shown at the right hand in Fig. 2.

As soon as the levers $f^5$ have passed over the cams $f^6$ the rods $f'$ are returned by the springs $f^2$ to their initial position and the gripping arms $c^2$ are returned by the springs $c^{2\times}$ to their closed or gripping positions.

The spindle $c^{11}$, above mentioned, is seated and movable endwise in the bore of a spindle $e^4$ which is secured at its outer end to the sleeve $d$, as shown in Fig. 5, and supports the spring $e'$.

The plate $b^{1\times}$, which forms the base of the pedestal $b'$, is slotted, as at $b^2$, to receive the screws $b^3$ by which the pedestal is secured to the base plate $b$, so as to permit relative adjustment of the two pedestals toward and from each other, to suit nuts of substantially different sizes. The nuts to be pared are assorted somewhat according to length of the major axis and by this adjustment of the pedestals the machine is suited to different grades. Minor differences in length of the nuts are accommodated by the yielding support of the chucks $c$ through the sliding of the rods $c^4$ in the plates $c^5$ and $c^6$ and the action of the spring $c^8$.

The knife $h$ is of horseshoe-shape, as shown in Fig. 3, having a blade $h'$ supported by and spaced from a block $h^2$. The latter is carried by a rod $h^3$ which is fixed adjustably in the upper end of an arm $h^4$, pivoted at its lower end, as at $h^5$, on the side of the frame $a$, the knife being pulled toward the axis of the rotation of the nut by a spring $h^6$ connected to the frame and to the swinging arm $h^4$.

In the operation of the machine the nuts are delivered, one at a time, through a chute $k$, shown in part only in Fig. 1, upon a suitable support, which might be the hand of the operator, with their major axes substantially in line with the axes of the two chucks $c$ of the pair of chucks which, in the travel of the chain $a^5$, have then reached substantially the position indicated in Fig. 1, but with the left hand end or pole of the nut slightly to the right of the plane in which the knife $h$ swings, the knife-blade standing then with its right hand side across the axis of the nut. The nut being held in this position for an instant, the levers $f^5$ of the approaching pedestal on the right strike the corresponding cams $f^6$ and the gripper arms are opened and then, as the levers $f^5$ pass from the cams $f^6$, the right hand chuck $c$ engages the right hand end of the nut and the right hand gripper arms $c^2$ close upon the nut. Immediately the pinion $d^4$ of the right hand pedestal is moved into mesh with the stationary rack $d^5$ and the right hand gripping devices are rotated, rotating the nut with them. As the movement of the nut toward the left, with both pedestals, continues, and the rotation of the nut also continues, the nut is rotated and moved longitudinally with respect to the knife which acts to pare the nut from the left hand pole to the region of the equator. When the nut has reached this position, about as represented in Fig. 2, the left hand gripper arms $c^2$, which have been opened by the action of the cams $f^6$ in coöperation with the left hand levers $f^5$ and are still held open, or permitted to close upon the nut and at the same time the left hand chuck $c^6$ is permitted to have a relative movement toward the right hand under the influence of the springs $e'$ and $f^2$ and the left hand chuck $c$ therefore engages the nut at the same time with or shortly before the engagement of the left hand gripper arms $c^2$ of the nut. In this manner the nut becomes engaged by the left hand gripping devices and immediately thereafter the right hand gripping devices are opened and withdrawn relatively so that the nut is released therefrom. Fig. 2 of the drawings shows the relative positions of the parts in which the nut has just been grasped by the left hand gripping devices and released by the right hand gripping devices. It will be understood that the portion of the nut which has been pared is engaged by the left hand gripping devices so that as the nut continues its movement toward the left and at the same time is rotated through the engagement of the left hand pinion $d^4$ with the fixed rack $d^{5x}$, the rotation and forward movement of the nut in contact with the knife are continued until the remainder of the nut has been pared. It will be understood that as the nut rotates and moves forward in contact with the knife, the point of contact of the knife with the nut changes from one side to the other so that the nut is completely pared from one pole to the other.

Various changes in details of construction and arrangement can be made to suit diffent conditions of use and the invention, therefore, is not restricted to the precise construction shown and described herein except as pointed out in the accompanying claims.

We claim as our invention:

1. In a machine of the character described, the combination of a supporting frame, a conveyer, means mounted on the conveyer for grasping and rotating the body to be operated upon and a knife mounted on the frame, the knife being mounted to swing toward and from the axis of rotation and held yieldingly toward such axis.

2. In a machine of the character described, the combination of a supporting frame, a conveyer, means mounted on the conveyer for grasping and rotating the body to be operated upon and a knife mounted on the frame, the knife being mounted to swing toward and from the axis of rotation and held yieldingly toward such axis, and having a general horseshoe-shape, whereby the knife may contact with the polar and lateral surfaces of the body.

3. In a machine of the character described, the combination of a supporting frame, a conveyer, gripping arms mounted on the conveyer and adapted to grasp the body to be operated upon and means to actuate the arms to grasp and release the body as the arms move with the conveyer.

4. In a machine of the character described, the combination of a supporting frame, a conveyer, gripping arms mounted on the conveyer and adapted to grasp the body to be operated upon, levers connected to the arms to operate and cams fixed on the frame and arranged to co-operate with the levers to actuate the arms.

5. In a machine of the character described, the combination of a rotating shaft, a plate carried by said shaft, oppositely disposed gripping arms pivoted on said plate, a second plate longitudinally movable on said shaft, operative connections between said second plate and said arms, and means to shift said second plate longitudinally.

6. In a machine of the character described, the combination of a rotating shaft, a plate carried by said shaft, oppositely disposed gripping arms pivoted on said plate, a second plate longitudinally movable on said shaft, rods connected to said arms and in operative engagement with said second plate, and means to shift said second plate longitudinally.

7. In a machine of the character described, the combination of a rotating shaft, a plate carried by said shaft, oppositely disposed gripping arms pivoted on said plate, a second plate longitudinally movable on said shaft, operative connections between said second plate and said arms, levers and operating connections between said levers and said second plate, and cams in operative relation with said levers.

8. In a machine of the character described, the combination of a rotating head, a chuck yieldingly mounted in said head, oppositely disposed gripping arms pivotally mounted on said head, and means to actuate said arms to engage and release the body to be operated upon.

9. In a machine of the character described, the combination of a pedestal, a sleeve mounted in said pedestal, means to rotate said sleeve, a shaft movable longitudinally in said sleeve and engaged therewith to be rotated thereby, gripping arms carried by said shaft, a plate mounted on said sleeve, operating connections between said plate and said arms, and means to move said plate longitudinally on said shaft.

10. In a machine of the character described, the combination of a pedestal, a sleeve mounted in said pedestal, means to rotate said sleeve, a shaft movable longitudinally in said sleeve and engaged therewith to be rotated thereby, a spring pressing said shaft normally forward, gripping arms carried by said shaft, a plate mounted on said sleeve, operating connections between said plate and said arms, and means to move said plate longitudinally on said shaft.

11. In a machine of the character described, the combination of a frame, a conveyer, a pair of pedestals mounted on the conveyer, and oppositely disposed sets of gripping arms carried by the pedestals.

12. In a machine of the character described, the combination of a frame, a conveyer, a pair of pedestals mounted on the conveyer, oppositely disposed sets of gripping arms carried by the pedestals, and means to operate said sets of gripping arms in succession, whereby the body operated upon is grasped by one set of arms, then grasped by the second set, then released by the first set, and finally released by the second set.

This specification signed this 16th day of Feby., A. D. 1920.

JAMES J. GORMLEY.
EDWIN L. THURBER.